United States Patent [19]

Jones, Jr.

[11] 4,134,101

[45] Jan. 9, 1979

[54] PROTECTIVE CIRCUIT FOR ELECTRONIC MOTOR VEHICLE ENGINE OPERATING TIMERS

[75] Inventor: John P. Jones, Jr., Wayne, Pa.

[73] Assignee: Air Products and Chemicals, Inc., Allentown, Pa.

[21] Appl. No.: 711,946

[22] Filed: Aug. 5, 1976

Related U.S. Application Data

[63] Continuation-in-part of Ser. No. 554,248, Feb. 28, 1975, which is a continuation of Ser. No. 388,097, Aug. 14, 1973, abandoned.

[51] Int. Cl.² ............... G04F 10/00; G08B 21/00
[52] U.S. Cl. .................... 340/52 D; 73/117.3; 324/182; 340/309.1; 361/111
[58] Field of Search ........... 340/52 R, 52 D, 309.1; 307/202 R; 325/362, 150; 324/182, 94; 73/116, 117.3, 136; 361/111

[56] References Cited

U.S. PATENT DOCUMENTS 3,291,109 12/1966 Neapolitakis .............. 123/148
3,355,731 11/1967 Jones, Jr. .................. 340/309.1
3,603,880 9/1971 Brecker, Jr. et al. ........... 324/182
3,686,484 8/1972 Ciemochowski .............. 235/92 FQ
3,688,296 8/1972 Donohue et al. ............. 340/228 R
3,760,228 9/1973 Uchida ........................ 317/31
3,875,505 4/1975 Goldberg ..................... 324/94
3,903,736 9/1975 Bissett et al. ................ 73/117.3
3,938,128 2/1976 Pidsosny et al. ............. 340/309.1

Primary Examiner—Donald J. Yusko
Assistant Examiner—Joseph E. Nowicki
Attorney, Agent, or Firm—James C. Simmons; Barry Moyerman

[57] ABSTRACT

Transistorized electronic timer circuits installed in motorized vehicles indicate the running time of the devices such as automobiles, trucks, motorcycles and the like which have a factory recommended servicing cycle. Because of the delicate nature of the transistors and timer devices and the presence of transient noises in automobile electrical systems, protective circuits were developed to prevent timer failures which might result in failure to meet engine service requirements or, in the case of newer vehicles, emission tests, etc.

4 Claims, 1 Drawing Figure

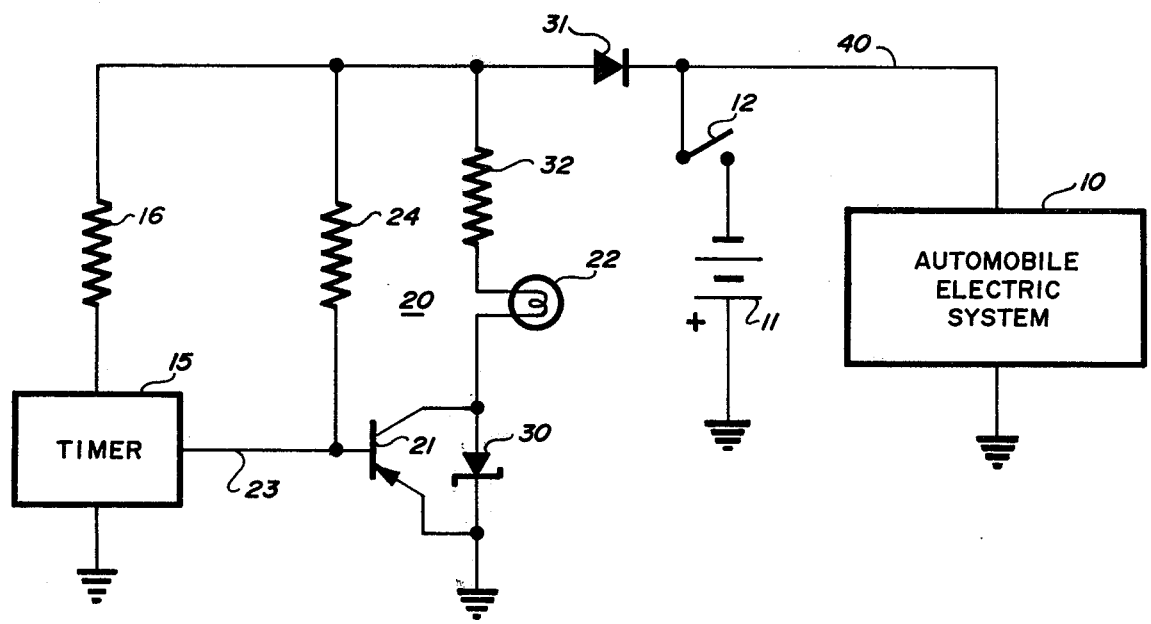

PROTECTIVE CIRCUIT FOR ELECTRONIC MOTOR VEHICLE ENGINE OPERATING TIMERS

CROSS-REFERENCE TO RELATED APPLICATIONS

This application is a continuation-in-part of Application Ser. No. 554,248 filed Feb. 28, 1975 which in turn was a continuation of Application Ser. No. 388,097 filed Aug. 14, 1973 and now abandoned.

BACKGROUND OF THE INVENTION

1. Field of the Invention

This invention relates to timing devices installed in motor driven vehicles such as automobiles, trucks, motorcycles, recreational vehicles, etc., to indicate the elapsed running time of the engine, and more particularly it relates to protective circuits in such devices which make them more reliable in the presence of transient voltage surges that may be encountered in motor vehicle electrical systems.

2. Description of the Prior Art

A preferred method of measuring the actual running time of a motor vehicle engine is disclosed in U.S. Pat. No. 3,355,731. Patentee therein discloses a coulometric timing apparatus employing an electrolytic cell having a sensing wire which is subjected to electrochemical action each time the electrical system of the vehicle engine to which it is attached is energized. At a predetermined time the wire is consumed and the associated circuitry turns on an indicator showing the time has elapsed. Improved capsules are disclosed in U.S. Pat. Nos. 3,711,751, 3,769,557, and 3,944,894. U.S. Pat. No. 3,291,109 is representative of a transistorized sparking system for direct drive of a high voltage ignition transformer. U.S. Pat. No. 3,686,484 discloses a prior art engine cycle counter employing electronic detection means and U.S. Pat. No. 3,875,505 discloses a regulated power supply carried in a motor vehicle instrumentation system to measure various engine parameters such as the number of times the crankshaft has rotated.

Until now there has been no recognition of the problem of momentary high voltage transient surges which can occur in an automotive ignition system that would be of such a magnitude that would destroy the transistor in a coulometric timing circuit.

SUMMARY OF THE INVENTION

It has been discovered that certain intermittent conditions can exist in modern motor vehicles, (e.g. automobiles, trucks, motorcycles, recreational vehicles) that will result in generation of high voltage transient surges in their electrical systems. For example, under certain conditions a voltage regulator, a solenoid or an accessory motor, may drop out at a time when an inductive spike may be induced in the electrical system. When electronic engine running time indicators are connected into the automobile electrical system, these surges can result in the disabling of the timers. Since these intermittent conditions may occur very infrequently, they may be acceptable for certain applications which can tolerate an occasional failure. However, if the timer is necessary to meet emission regulations or is used under other critical conditions, the possibility of intermittent failures from this condition of random high voltage transient surges can be corrected by including in the timing circuit a Zener diode limiting the magnitude of high voltage transients occurring in a forward direction and a crystal diode limiting the magnitude of high voltage transients occurring in the reverse direction from those limited by the Zener diode.

According to the present invention, transistorized electronic timer circuits coupled in an automobile electrical system are protected against intermittent transient voltage surges by means of protective circuits, including a Zener diode connected in shunt with the transistor emitter-collector path and a crystal diode and current limiting resistor connected in series with the emitter-collector path of the transistor.

It is, therefore, a general object of the invention to provide more reliable electronic timer circuits for use in motor vehicle electrical systems.

A more specific object of the invention is to provide ruggedized electronic automobile timer circuits that are operable in the presence of high voltage transient surges.

BRIEF DESCRIPTION OF THE DRAWING

The single drawing FIGURE is a schematic circuit diagram of a preferred embodiment of the invention.

DESCRIPTION OF THE PREFERRED EMBODIMENT

As may be seen in the drawing, a motor vehicle (e.g. automobile) electrical system is shown as block diagram form 10. While the invention will be described in relation to an automobile electrical system it should be understood that the invention can be used with any motor driven apparatus wherein the motor includes an electrical system to operate accessories such as lights, starter motors and the like. Therefore the invention can be used with trucks, motorcycles, recreational vehicles, lawn and agricultural tractors, industrial tractors, material handling equipment (e.g. forklift trucks) boats and the like having an electrical system in conjunction with a motorized propulsion system. This would include the ignition and generator circuits as well as various accessories, which are generally activated from the automobile battery 11 when the ignition key 12 is closed. Accordingly, an electric timer 15 may be connected for operation from battery 11 only when the ignition key 12 is closed to give an accurate elapsed time indication of the automobile running time. The timer is preferably an inexpensive throw away electrolytic cell of the type described in U.S Pat. No. 3,355,731 which is incorporated into this disclosure by reference, but which is not described again in detail since it is well known in the art and might tend to obscure the nature of the present improvement thereover. If the timer 15 is current responsive as the electrolytic cell is, then the elapsed time period may be simply established by a calibrated current limiting resistor 16 chosen to produce a known operating time to end-of-life with current flow through resistor 16 from battery 11. Thus the elapsed running time of the automobile is measured indicating the time for a service operation such as the change of a filter which might be used to reduce emission of gases into the atmosphere.

A transistorized detection circuit 20, preferably using a single transistor amplifier stage 21 is used to detect the time period signal presented by timer 15. This circuit may be used to present a visual signal by lighting a lamp 22, for example. If the base circuit lead 23 is ungrounded at the end of a measured time period, as for example by rupture of a sensing wire passing through an electrolytic cell from 23 to ground, then because of resistor 24 the transistor 21 conducts and lights alarm lamp 22, whenever the ignition switch 12 is closed.

One or more of the circuit protective elements 30, 31, 32 may be incorporated in accordance with this invention to avoid damage to transistor 21 that will disable the alarm signal at lamp 22, or other end-of-time-period indicator operated by the transistorized detector circuitry 20.

For example, consider the operation of Zener diode 30 connected in shunt with the transistor emitter-collector path. If the battery voltage is 12 volts, then the Zener diode 30 avalanche voltage breakdown level is for example 25 volts. Accordingly any transient surges will cause the voltage across the transistor 21 to be limited to 25 volts and thus protect the transistor 21 against damage or burn-out, where the timing indication will become disabled. This type of circuit protector would be useful in any usual sort of automobile circuit transient surges up to about four hundred volts.

Additional protection may be afforded by crystal diode 31, series connected with the emitter-collector path of transistor 21. This will provide protection against reverse transient voltages on the order of 100 volts depending upon the diode characteristics. Diode 31 acts as a very high (megohm) resistance in the reverse direction, therefore, all of the transient surge would be dropped across the diode at a negligible current level, consequently no appreciable voltage appears across transistor 21.

In addition, current limiting resistor 32 may be made available in some cases to cause an IR drop in the presence of high voltage transients on lead 40 in the forward direction, when the Zener diode 30 is conducting transistor voltage.

Note that if ignition switch 12 is opened, and the control relay drops out before the generator stops rotating, there may be transients on lead 40 of high voltage level because battery 11 does not effectively short them to ground. Thus the mere act of turning off the ignition may induce high voltage transient surges in a circuit of the nature shown. The resistor 32 may be typically used if the battery voltage is 12 volts with a six volt lamp 22 so that resistor 32 drops six volts with the rated lamp-transistor current through the emitter-collector path.

It may be seen therefore that the circuitry provided by this invention is not subject to intermittent failure when a spurious high voltage noise transient is developed in the automobile electrical system and therefore improves the operational reliability of timer circuits used in automobiles.

As set out above the circuit of the present invention is applicable to protect transistorized detection circuits for coulometric timing devices used to measure the actual operating hours of an engine used to power a motor vehicle.

Having thus described my invention what I desire to be secured by Letters Patent of the United States is set out in the appended claims.

1. For operation in a motor vehicle electrical system presenting high transient voltages on the order of at least 100 volts when the automobile is operating and when the ignition switch is opened, a combination comprising, an automobile battery, an electrolytic cell connected in said automobile electric system powered by the automobile battery to determine cumulative time of operation of the automobile, an amplifier circuit having therein a single normally nonconductive transistor with a collector-emitter path connected across said battery, a detection circuit incorporating said transistor connected to said timer for turning on said transistor and producing a signal only after a predetermined cumulative time period, a circuit including said ignition switch operable to connect the automobile battery to actuate said electrolytic cell for cumulating time only during operation of the automobile, and a protective circuit for said single transistor comprising a Zener diode and a crystal diode-resistor combination, said crystal diode-resistor combination connected in series circuit between said battery and said transistor collector-emitter path, said Zener diode being connected to the collector-emitter terminals of said single transistor, said Zener diode selected for only conducting at a voltage value substantially greater than that of said battery thereby not providing a power supply function for said detection circuit but only the function of limiting the magnitude of high voltage transients occurring across said collector-emitter terminals both during the time the transistor is nonconductive and the transistor is turned on a lamp coupled in the series circuit with said crystal diode-resistor combination and said Zener diode being directly connected only to said collector-emitter terminals whereby said resistor operates in the dual role as transient suppressor resistor for said Zener diode and along with said lamp as the load resistance for said transistor, said crystal diode limiting the magnitude of high voltage transients occurring in the reverse direction from those limited by said Zener diode thereby to prevent failure of said transistor in the presence of said high voltage transients.

2. A system according to claim 1 wherein said electrolytic cell includes a sensing wire disposed in an electrolyte disposed in said circuit so that the sensing wire is subjected to electrochemical action only when said circuit is activated by said motor vehicle electrical system.

3. The system according to claim 2 in which said lamp is coupled between said resistor and said collector which is lit upon turn on of said transistor after said predetermined cumulative time period.

4. A system according to claim 3 in which said detection circuit includes a calibrated current limiting resistor, said calibrated resistor being connected directly between a common junction of said crystal diode-resistor combination and said electrolytic cell thereby to provide current flow from the battery through a path comprising said calibrated resistor and said crystal diode.

* * * * *